United States Patent
Distaso et al.

(10) Patent No.: US 10,123,556 B2
(45) Date of Patent: *Nov. 13, 2018

(54) METHOD FOR COOKING FOOD USING STEAM

(71) Applicant: Whirlpool Corporation, Benton Harbor, MI (US)

(72) Inventors: Tamara Distaso, Cassinetta (IT); Stefania Fraccon, Cassinetta (IT)

(73) Assignee: Whirlpool Corporation, Benton Harbor, MI (US)

( * ) Notice: Subject to any disclaimer, the term of this patent is extended or adjusted under 35 U.S.C. 154(b) by 836 days.

This patent is subject to a terminal disclaimer.

(21) Appl. No.: 14/225,657

(22) Filed: Mar. 26, 2014

(65) Prior Publication Data

US 2014/0205727 A1 Jul. 24, 2014

Related U.S. Application Data

(63) Continuation of application No. 11/123,939, filed on May 6, 2005, now abandoned.

(51) Int. Cl.
*A21B 1/24* (2006.01)
*A21B 3/04* (2006.01)
*A23L 1/01* (2006.01)
*F24C 15/32* (2006.01)
*A23L 5/10* (2016.01)

(52) U.S. Cl.
CPC ............. *A23L 1/0121* (2013.01); *A21B 1/24* (2013.01); *A23L 5/13* (2016.08); *F24C 15/327* (2013.01); *A21B 3/04* (2013.01)

(58) Field of Classification Search
None
See application file for complete search history.

(56) References Cited

U.S. PATENT DOCUMENTS

| | | | |
|---|---|---|---|
| 213,029 | A | 3/1879 | Ashcroft |
| 339,228 | A | 4/1886 | Smith |
| 1,332,216 | A | 3/1920 | Hodge |
| 1,544,481 | A | 6/1925 | Reese |
| 1,792,465 | A | 2/1931 | Peterson |

(Continued)

FOREIGN PATENT DOCUMENTS

| | | |
|---|---|---|
| BR | PI0601034 A | 12/2006 |
| BR | PI0601041 A | 12/2006 |

(Continued)

OTHER PUBLICATIONS

Lazy Day Brunch Casserole (Crustless Quiche), Food.com [on line] Jan. 5, 2005, retrieved on May 6, 2012. Retrieved the from Internet: URL<http://www.food.com/receipe/lazy-day-brunch-casserole-crustless-quiche-107697>.

(Continued)

*Primary Examiner* — Joseph M Pelham (57) ABSTRACT

A method of cooking food, such as fish and vegetables, using steam during a cooking cycle comprises a preheating step where the cavity is heated toward a cooking temperature and a cooking step where the cavity is maintained at the cooking temperature. The preheating step comprises a dry preheating step where no steam is introduced into the cooking cavity and a steam preheating step where steam is introduced into the cavity.

20 Claims, 6 Drawing Sheets

(56) References Cited

U.S. PATENT DOCUMENTS

| | | | |
|---|---|---|---|
| 1,870,459 | A | 8/1932 | Klenk |
| 2,141,591 | A | 12/1938 | Bonner |
| 2,502,172 | A | 3/1950 | Paulsen |
| 2,636,969 | A | 4/1953 | Lewis |
| 2,885,194 | A | 5/1959 | Winkler |
| 3,299,800 | A | 1/1967 | Angelo |
| 3,331,943 | A | 7/1967 | Eff |
| 3,364,338 | A | 1/1968 | Holtkamp |
| 3,394,665 | A | 7/1968 | Williams |
| 3,503,760 | A | 3/1970 | Allen |
| 3,518,949 | A | 7/1970 | Stock |
| 3,732,396 | A | 5/1973 | Tucker |
| 3,751,632 | A | 8/1973 | Kaurenen |
| 3,814,901 | A | 6/1974 | Morhack |
| 3,815,949 | A | 6/1974 | Ulert |
| 3,820,524 | A | 6/1974 | Buckell |
| 3,839,616 | A | 10/1974 | Risman |
| 3,873,363 | A | 3/1975 | Bakka et al. |
| 3,947,241 | A | 3/1976 | Caridis et al. |
| 4,010,349 | A | 3/1977 | Lee |
| 4,011,805 | A | 3/1977 | Vegh et al. |
| 4,058,635 | A | 11/1977 | Durth |
| 4,245,148 | A | 1/1981 | Gisske et al. |
| 4,258,731 | A | 3/1981 | Tsujimoto et al. |
| 4,267,976 | A | 5/1981 | Chatwin |
| 4,367,724 | A | 1/1983 | Willett |
| 4,426,923 | A | 1/1984 | Ohata |
| 4,496,906 | A | 1/1985 | Clack |
| 4,623,780 | A | 11/1986 | Shelton |
| 4,655,192 | A | 4/1987 | Jovanovic |
| 4,700,685 | A | 10/1987 | Miller |
| 4,724,824 | A | 2/1988 | McCoy et al. |
| 4,737,373 | A | 4/1988 | Forney |
| 4,806,912 | A | 2/1989 | Clack |
| 4,817,582 | A | 4/1989 | Oslin et al. |
| 4,835,368 | A | 5/1989 | Fortmann et al. |
| 4,876,426 | A | 10/1989 | Smith |
| 4,906,485 | A | 3/1990 | Kirchhoff |
| 4,913,039 | A | 4/1990 | Sutphen |
| 4,920,948 | A | 5/1990 | Koether et al. |
| 4,924,071 | A | 5/1990 | Jacobs |
| 4,924,072 | A | 5/1990 | Oslin |
| 4,991,545 | A | 2/1991 | Rabe et al. |
| 5,014,679 | A | 5/1991 | Childs et al. |
| 5,075,120 | A | 12/1991 | Leary et al. |
| 5,075,121 | A | 12/1991 | Leary et al. |
| 5,077,065 | A | 12/1991 | Ash et al. |
| 5,171,974 | A | 12/1992 | Koether et al. |
| 5,176,856 | A | 1/1993 | Takahashi et al. |
| 5,200,225 | A | 4/1993 | Apaydin |
| 5,209,941 | A | 5/1993 | Wuest |
| 5,215,000 | A | 6/1993 | Desage et al. |
| 5,235,902 | A | 8/1993 | Ogawa et al. |
| 5,279,676 | A | 1/1994 | Oslin et al. |
| 5,318,792 | A | 6/1994 | Tippman |
| 5,330,223 | A | 7/1994 | Hiramitsu et al. |
| 5,355,840 | A | 10/1994 | Violi |
| 5,367,145 | A | 11/1994 | Takagi |
| 5,369,252 | A | 11/1994 | Kondo |
| 5,411,753 | A | 5/1995 | Tippmann |
| 5,463,940 | A | 11/1995 | Cataldo |
| 5,474,789 | A | 12/1995 | Hayami et al. |
| 5,494,690 | A | 2/1996 | Shelton |
| 5,512,312 | A | 4/1996 | Forney et al. |
| 5,515,773 | A | 5/1996 | Builard |
| 5,525,782 | A | 6/1996 | Yoneno et al. |
| 5,527,450 | A | 6/1996 | Burrows |
| 5,532,456 | A | 7/1996 | Smith et al. |
| 5,549,038 | A | 8/1996 | Kolvites |
| 5,552,578 | A | 9/1996 | Violi |
| 5,619,983 | A * | 4/1997 | Smith .......................... 126/348 |
| 5,631,033 | A | 5/1997 | Kolvites |
| 5,640,946 | A | 6/1997 | Oslin |
| 5,653,919 | A | 8/1997 | White et al. |
| 5,662,959 | A | 9/1997 | Tippmann |
| 5,680,810 | A | 10/1997 | Sham |
| 5,694,835 | A | 12/1997 | Mangina |
| 5,710,409 | A | 1/1998 | Scwarzbacker et al. |
| 5,756,970 | A | 5/1998 | Barger et al. |
| 5,768,982 | A | 6/1998 | Violi et al. |
| 5,938,959 | A | 8/1999 | Wang |
| 5,942,142 | A | 8/1999 | Forney et al. |
| 5,945,018 | A | 8/1999 | Halen |
| 5,967,020 | A | 10/1999 | Soyama et al. |
| 6,023,050 | A | 2/2000 | Violi |
| 6,035,763 | A | 3/2000 | Yung |
| 6,040,564 | A | 3/2000 | Ueda et al. |
| 6,078,178 | A | 6/2000 | Barnett |
| 6,133,558 | A | 10/2000 | Ueda et al. |
| 6,138,558 | A | 10/2000 | Ueda et al. |
| 6,175,100 | B1 | 1/2001 | Creamer et al. |
| 6,188,045 | B1 | 2/2001 | Hansen et al. |
| 6,202,637 | B1 | 3/2001 | Roberts |
| 6,217,751 | B1 | 4/2001 | Peeters |
| 6,233,464 | B1 | 5/2001 | Chmaytelli |
| 6,267,045 | B1 | 7/2001 | Wiedemann et al. |
| 6,318,246 | B2 | 11/2001 | Fukushima et al. |
| 6,323,464 | B1 | 11/2001 | Cohn |
| 6,323,467 | B1 | 11/2001 | Alsafadi |
| 6,342,262 | B1 | 1/2002 | Wuest |
| 6,453,802 | B1 | 9/2002 | Manganiello et al. |
| 6,497,907 | B2 * | 12/2002 | Hofer .......................... 426/233 |
| 6,521,871 | B1 | 2/2003 | Shelton |
| 6,545,251 | B2 | 4/2003 | Allera et al. |
| 6,565,762 | B1 | 5/2003 | Silverbrook |
| 6,570,136 | B1 | 5/2003 | Lockwood et al. |
| 6,572,911 | B1 | 6/2003 | Corcoran et al. |
| 6,666,086 | B2 | 12/2003 | Colman et al. |
| 6,727,478 | B2 | 4/2004 | Rael et al. |
| 6,743,454 | B1 | 6/2004 | Gibson et al. |
| 6,773,738 | B2 | 8/2004 | Berger et al. |
| 6,815,644 | B1 | 11/2004 | Muegge et al. |
| 6,833,032 | B1 | 12/2004 | Douglas et al. |
| 6,900,414 | B2 | 5/2005 | Fisher |
| 6,909,070 | B2 | 6/2005 | Veltrop et al. |
| 6,909,071 | B2 | 6/2005 | Shozo |
| 6,972,397 | B2 | 12/2005 | Ha |
| 7,060,941 | B1 * | 6/2006 | Embury et al. .......... 219/401 |
| 7,091,454 | B2 | 8/2006 | Cho et al. |
| 7,113,695 | B2 | 9/2006 | Ono |
| 7,199,340 | B2 | 4/2007 | Yamasaki et al. |
| 7,208,701 | B2 * | 4/2007 | Fraccon et al. .......... 219/401 |
| 7,235,762 | B2 | 6/2007 | Gagas et al. |
| 7,537,004 | B2 | 5/2009 | Reay |
| 7,745,763 | B2 * | 6/2010 | Fraccon et al. .......... 219/413 |
| 7,867,534 | B2 | 1/2011 | Sells et al. |
| 8,207,477 | B2 * | 6/2012 | Embury et al. .......... 219/494 |
| 8,697,166 | B2 * | 4/2014 | Embury et al. .......... 426/510 |
| 2001/0051202 | A1 | 12/2001 | Hofer |
| 2002/0179588 | A1 | 12/2002 | Lubrina et al. |
| 2003/0132312 | A1 | 7/2003 | Kelly |
| 2004/0022909 | A1 | 2/2004 | Holm et al. |
| 2004/0226934 | A1 | 11/2004 | Moore, Jr. et al. |
| 2004/0232141 | A1 | 11/2004 | Yamasaki et al. |
| 2004/0256482 | A1 | 12/2004 | Linden |
| 2004/0261632 | A1 | 12/2004 | Hansen et al. |
| 2005/0006382 | A1 | 1/2005 | Hayakawa et al. |
| 2005/0034718 | A1 | 2/2005 | Van Over |
| 2005/0051036 | A1 | 3/2005 | Erdmann et al. |
| 2006/0000821 | A1 | 1/2006 | Gerola et al. |
| 2006/0249136 | A1 | 11/2006 | Reay |
| 2006/0249137 | A1 | 11/2006 | Reay |
| 2006/0251784 | A1 * | 11/2006 | Sells et al. ............... 426/510 |
| 2006/0251785 | A1 * | 11/2006 | Fraccon et al. .......... 426/510 |
| 2006/0289438 | A1 * | 12/2006 | Fraccon et al. .......... 219/401 |
| 2007/0062927 | A1 | 3/2007 | Sells et al. |
| 2007/0104844 | A1 * | 5/2007 | Fraccon et al. .......... 426/496 |
| 2007/0138160 | A1 * | 6/2007 | Ando et al. ............... 219/401 |
| 2008/0032018 | A1 | 2/2008 | Garniss et al. |
| 2008/0095905 | A1 | 4/2008 | Sells et al. |
| 2009/0133684 | A1 | 5/2009 | Embury et al. |
| 2009/0136640 | A1 * | 5/2009 | Embury et al. .......... 426/510 |

(56) References Cited

U.S. PATENT DOCUMENTS

| | | | |
|---|---|---|---|
| 2009/0272729 A1* | 11/2009 | Ando et al. | 219/401 |
| 2010/0178395 A1 | 7/2010 | Embury et al. | |
| 2011/0068093 A1 | 3/2011 | Sells et al. | |

FOREIGN PATENT DOCUMENTS

| | | |
|---|---|---|
| BR | PI0601130 A | 12/2006 |
| BR | PI0601196 A | 12/2006 |
| BR | PI0601213 A | 12/2006 |
| BR | PI0601334 A | 12/2006 |
| BR | PI0601214 A | 3/2007 |
| BR | PI0601331 A | 8/2007 |
| CA | 2524764 A1 | 10/2006 |
| CA | 2524583 A1 | 11/2006 |
| CA | 2524597 A1 | 11/2006 |
| CA | 2524757 A1 | 11/2006 |
| CA | 2524763 A1 | 11/2006 |
| CA | 2524766 A1 | 11/2006 |
| CA | 2524604 A1 | 1/2007 |
| CA | 2534521 A1 | 3/2007 |
| CN | 1928426 A | 3/2007 |
| DE | 3909283 A1 | 10/1990 |
| DE | 4303656 A1 | 8/1994 |
| DE | 19741881 | 3/1999 |
| DE | 10335295 A1 | 3/2005 |
| EP | 0233535 A2 | 8/1987 |
| EP | 0277337 A2 | 8/1988 |
| EP | 0438372 A2 | 7/1991 |
| EP | 0517681 A2 | 12/1992 |
| EP | 0643923 A1 | 3/1995 |
| EP | 0768055 A1 | 4/1997 |
| EP | 0893084 A1 | 1/1999 |
| EP | 0894460 A1 | 2/1999 |
| EP | 1010384 A1 | 6/2000 |
| EP | 1166694 A1 | 1/2002 |
| EP | 1372358 A1 | 12/2003 |
| EP | 1382280 A1 | 1/2004 |
| EP | 1458220 A1 | 9/2004 |
| EP | 1496314 A1 | 1/2005 |
| EP | 1714555 A2 | 10/2006 |
| EP | 1719414 A2 | 11/2006 |
| EP | 1719415 A2 | 11/2006 |
| EP | 1719417 A2 | 11/2006 |
| EP | 1724529 A1 | 11/2006 |
| EP | 1724530 A1 | 11/2006 |
| EP | 1744104 A1 | 1/2007 |
| EP | 1761111 A2 | 3/2007 |
| FR | 2589678 A1 | 5/1987 |
| FR | 2652234 A1 | 3/1991 |
| FR | 2840392 A1 | 12/2003 |
| GB | 15098 A | 2/1910 |
| GB | 2373714 A | 10/2002 |
| GB | 2400298 A | 10/2004 |
| JP | 55068249 | 5/1980 |
| JP | 57077829 A | 5/1982 |
| JP | 6014756 | 1/1994 |
| JP | 8038134 | 2/1996 |
| JP | 9004856 | 1/1997 |
| JP | 2000093341 A | 4/2000 |
| JP | 2001346549 A | 12/2001 |
| KR | 2002006215 A | 1/2002 |
| KR | 20060110746 A | 10/2006 |
| KR | 20060115327 A1 | 11/2006 |
| KR | 20060115329 A | 11/2006 |
| KR | 20060115332 A | 11/2006 |
| KR | 20060115333 A | 11/2006 |
| KR | 20060115579 A | 11/2006 |
| KR | 20070007701 A | 1/2007 |
| KR | 20070027429 A | 3/2007 |
| MX | PA05013410 A | 1/2007 |
| MX | PA06003631 A | 3/2007 |
| SU | 500788 A1 | 1/1976 |
| WO | 9534220 A1 | 12/1995 |
| WO | 9734491 A1 | 9/1997 |
| WO | 9852418 A1 | 11/1998 |
| WO | WO 9933347 A1 * | 7/1999 |
| WO | 9953767 A1 | 10/1999 |
| WO | 03023285 A2 | 3/2003 |

OTHER PUBLICATIONS

European Search Report for EP1724529 dated Sep. 29, 2006.
European Search Report for EP1744104 dated Oct. 26, 2006.
European Search Report for EP1761111 dated Nov. 3, 2008.
European Search Report for EP1719414 dated Jul. 31, 2006.
European Search Report for EP1724530 dated Sep. 15, 2006.
European Search Report for Counterpart EP06113542.2, dated Sep. 11, 2017.

* cited by examiner

| PARAMETER | FISH | VEGETABLES A | VEGETABLES B |
|---|---|---|---|
| First Temperature Range | 195-230 °F | 195-230 °F | 195-230 °F |
| First Temperature | 212 °F | 212 °F | 212 °F |
| Duration of Dry Preheating Step | 5 minutes | 5 minutes | 5 minutes |
| First Preheating Rate | ~ 28 F/minute | ~ 28 F/minute | ~ 28 F/minute |
| Second Temperature Range | 280-350 °F | 300-390 °F | 300-390 °F |
| Second Temperature | 340 °F | 340 °F | 340 °F |
| Duration of Steam Preheating Step | 10 minutes | 10 minutes | 10 minutes |
| Second Preheating Rate | ~ 13 °F/minute | ~ 13 °F/minute | ~ 13 °F/minute |
| Steam Duty Cycle | 100% | 100% | 50% |
| Duration of Steam Introduction | 20-40% | 30-80% | 20-40% |

Fig. 6

METHOD FOR COOKING FOOD USING STEAM

CROSS REFERENCE TO RELATED APPLICATIONS

This application is a continuation of U.S. patent application Ser. No. 11/123,939, filed May 6, 2005, which is hereby incorporated by reference.

BACKGROUND OF THE INVENTION

Field of the Invention

The invention relates to a method for cooking food, specifically fish and vegetables, in an automated household oven using steam.

Description of the Related Art

The benefits of cooking food, including fish and vegetables, with steam are widely recognized and include accelerating the cooking process, moisturizing the food during the cooking process, and preserving flavor, vitamins, and nutrients. Additionally, cooking with steam results in a more homogeneously cooked food item having an appearance that appeals to the senses. Over the years, cooks have developed various kinds of home remedies, such as inserting a bath of water and/or ice cubes into the cooking cavity, for providing steam into the cooking cavity. For convenience and to eliminate problems with consistency and timing of steam introduction associated with these home remedies, some contemporary household ovens incorporate an automated steam generating system that introduces steam into the cooking cavity of the oven. It would be helpful to the user for ovens to include automated programs dedicated to particular types of foods to ensure that appropriate amounts of steam are introduced into the cooking cavity at appropriate times during the cooking cycle so that the food is properly cooked and that the benefits of cooking with steam are fully realized.

SUMMARY OF THE INVENTION

A method of cooking food using steam during a cooking cycle with a cooking time in an automated household oven with a cooking cavity, a heating system for heating the cooking cavity, and a steam system for introducing steam into the cooking cavity comprises a preheating step where the cavity is heated toward a cooking temperature and comprising a dry preheating step where no steam is introduced into the cooking cavity and a steam preheating step where steam is introduced into the cavity; and a cooking step where the cavity is maintained at the cooking temperature.

The steam can be introduced into the cavity at the beginning of the steam preheating step.

The dry preheating step can comprise heating the cavity to a first temperature. The first temperature can be about the boiling point of water. The steam preheating step can further comprise heating the cavity from the first temperature to the second temperature. The second temperature can be the cooking temperature. The cooking temperature can be in a range of about 280° F. to about 350° F. The cooking temperature can be in a range of about 300° F. to about 390° F. The cooking temperature can be about 340° F.

The cooking step can comprise introducing steam into the cavity. The introduction of steam during the cooking step can be a continuation of the introduction of steam during the steam preheating step. The cooking step can further comprise ceasing the introduction of steam before the end of the cooking step.

The introduction of steam can have a duration in a range of about 20-40% of the cooking time. The introduction of steam can have a duration in a range of about 30-80% of the cooking time. A duty cycle of a boiler for the steam system can be in a range of about 50% to about 100% during the introduction of steam. The duty cycle of the boiler for the steam system can be about 100% during the introduction of steam. The duty cycle of the boiler for the steam system can be about 50% during the introduction of steam.

A duty cycle of an upper heating element for creating top heat and a duty cycle of a lower heating element for creating bottom heat can be about 100% during the preheating step. The cooking step can comprise reducing at least one of the top heat and bottom heat. The cooking step can further comprise reducing both of the top heat and bottom heat.

The food is can be the cavity during the steam preheating step. The food can be in the cavity during the dry preheating step.

The steam preheating step can be after the dry preheating step.

The steam preheating step can be longer than the dry preheating step.

DESCRIPTION OF EMBODIMENTS OF THE INVENTION

Figure 1:
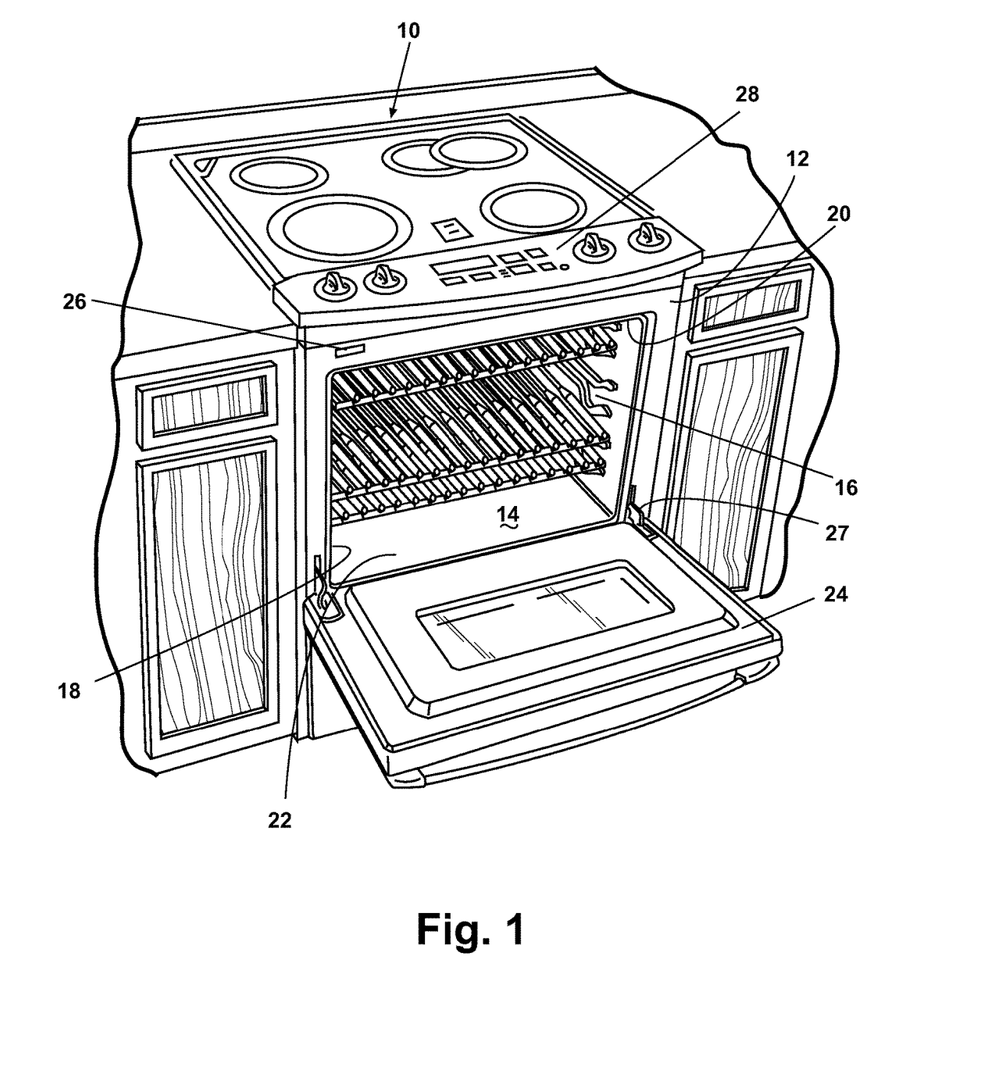
FIG. 1 is a perspective view of an exemplary automatic household oven.
Figure 2:
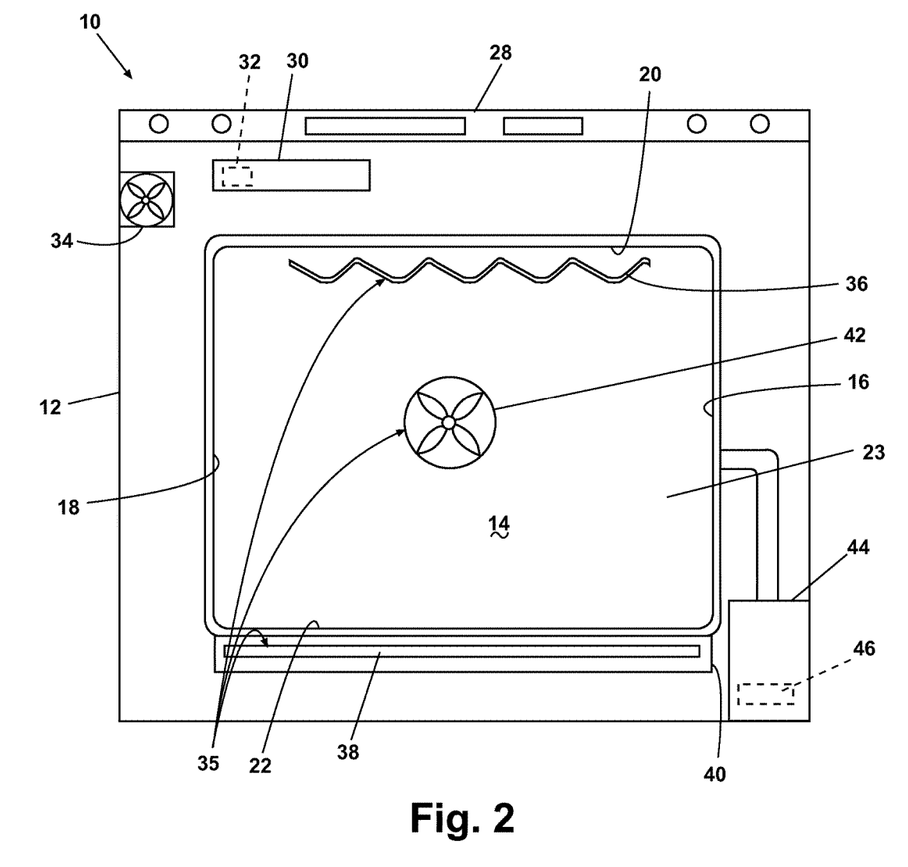
FIG. 2 is a schematic view of the oven of FIG. 1.

Referring now to the figures, FIG. 1 illustrates an exemplary automatic household oven 10 that can be used to implement a method for cooking fish and vegetables with steam according to one embodiment of the invention. The oven 10 comprises a cabinet 12 with an open-face cooking cavity 14 defined by cooking cavity walls: a pair of spaced side walls 16, 18 joined by a top wall 20, a bottom wall 22, and a rear wall 23 (FIG. 2). A door 24 pivotable at a hinge 27 selectively closes the cavity 14, and a sensor 26 detects an open position of the door 24 and a closed position of the door 24. When the door 24 is in the open position, a user can access the cavity 14, while the door 24 in the closed position prevents access to the cavity 14 and seals the cavity 14 from the external environment.

The oven 10 further comprises a control panel 28 with a user interface accessible to the user for inputting desired cooking parameters, such as temperature and time, of manual cooking cycles or for selecting automated cooking cycles. The user interface can comprise, for example, a rotatable knob, a push button, a touch pad, a touch screen, or a voice command unit. The control panel 28 communicates with a controller 30 located in the cabinet 12, as shown in FIG. 2. The controller 30 can be a proportional-integral-derivative (PID) controller or any other suitable controller, as is well-known in the automatic oven art. The controller 30 stores data, such as default cooking parameters, the manually input cooking parameters, and programs for the automated cooking cycles, receives input from the control panel 28, and sends output to the control panel 28 for displaying a status of the oven 10 or otherwise communicating with the user. Additionally, the controller 30 includes a timer 32 for tracking time during the manual and automated cooking cycles and a cooling fan 34 located in the cabinet 12 for drawing cooling air into the cabinet 12 and directing the air toward the controller 30 to avoid overheating of the controller 30 by heat conducted from the cavity 14. The cooling air flows around the outside of the cooking cavity walls 16, 18, 20, 22, 23.

With continued reference to FIG. 2, the oven 10 further comprises a heating system 35 having an upper heating element 36, commonly referred to as a broiler, and a lower heating element 38. The schematic illustration of the FIG. 2 shows the lower heating element 38 as being hidden or mounted beneath the cooking cavity bottom wall 22 in a heating element housing 40. Heat from the lower heating element 38 conducts through the bottom wall 22 and into the cavity 14. Alternatively, the lower heating element 38 can be mounted inside the cavity 14, as is well-known in the oven art. Further, the upper and lower heating elements 36, 38 can be mounted at the side walls 16, 18 of the cavity 14, as disclosed in U.S. Pat. No. 6,545,251 to Allera et al., which is incorporated herein by reference in its entirety. During use, the upper heating element 36 creates top heat, or heat emanating from the upper heating element 36 to an upper portion of the cavity 14, and the lower heating element 38 creates bottom heat, or heat emanating from the lower heating element 38 to a lower portion of the cavity 14. The heating system 35 according to the illustrated embodiment further comprises a convection fan 42 that circulates air and steam, when present, within the cavity 14. The convection fan 42 can be any suitable fan and can be mounted in any suitable location of the cavity 14, such as in the rear wall 23.

In addition to the heating system, the oven 10 comprises a steam system 44 preferably mounted within the cabinet 12 and configured to introduce steam into the cavity 14. The steam system 44 in the illustrated embodiment comprises a boiler 46 that heats water stored in the steam system 44. However, the steam system 44 can be any suitable system that is capable of introducing steam directly into the cavity 14 or introducing water that is turned into steam in the cavity 14 and is not limited to the system shown schematically in FIG. 2.

Ovens having a heating system and a steam system are commonly referred to as combi steam ovens. The heating system can be employed alone, as in a traditional oven, or in combination with the steam system. When both the heating system and the steam system are utilized, the steam system functions as a support or accessory for the heating system. Alternatively, the steam system can be used alone for cooking with steam only.

Figure 3:
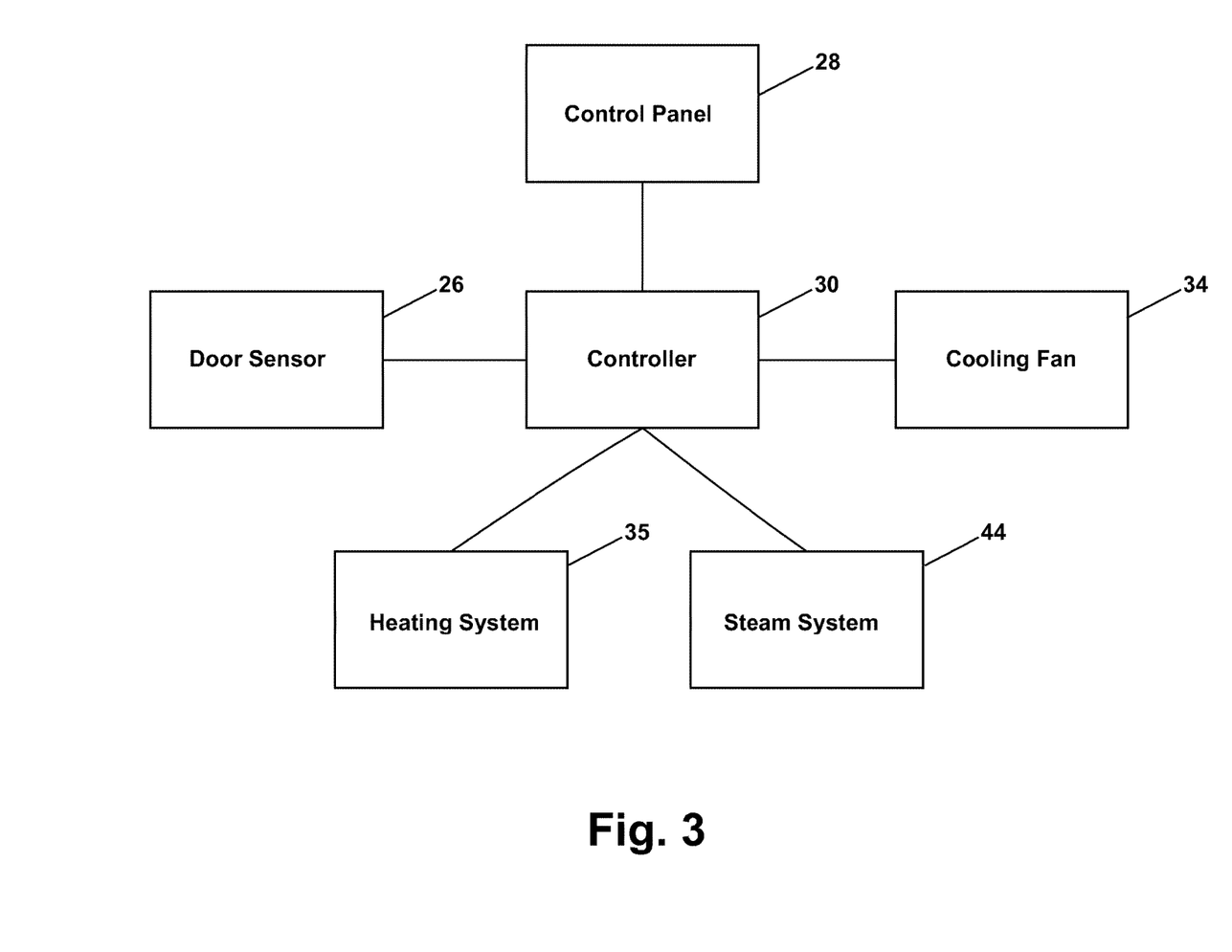
FIG. 3 is a schematic diagram illustrating a control system of the oven of the FIG. 1.

FIG. 3 is a block diagram that schematically illustrates a control system of the oven 10. The control system comprises the controller 30, which operably communicates with the control panel 28, as described above, the door sensor 26, the cooling fan 34, the heating system 35, and the steam system 44. The door sensor 26 communicates to the controller 30 the open or closed position of the door 24, and the controller 30 communicates with the cooling fan 34 to activate or deactivate the cooling fan 34 to control the temperature of the controller 30. The controller 30 instructs the heating system 35 to activate or deactivate the upper heating element 36, the lower heating element 38, and the convection fan 42, either all together, individually, or in groups, and provides instructions regarding the desired temperature of the cavity 14 and the rate at which the heating system 35 heats the cavity 14. Similarly, the controller 30 instructs the steam system 44 to activate or deactivate the boiler 46 and provides instructions regarding the desired temperature of the water in the steam system 44 in order to achieve the desired relative humidity in the cavity 14.

As stated above, the exemplary oven 10 can be used to implement a method 50 of cooking food, especially fish and vegetables, with steam according to one embodiment of the invention. During the method 50, the heating system 35 operates to control a temperature of the cavity 14, and the steam system 44 operates to control a relative humidity of the cavity 14. The temperature and the relative humidity during the stages are selected to produce a fish or vegetable item having a desired outer texture, color, and taste and having a desired doneness. For fish, the doneness can correspond to the degree to which the inner regions of the fish are cooked (i.e., rare, medium rare, medium, medium well, and well done), while the doneness of the vegetables can correspond to the degree of crispiness of the vegetable. As used herein, the term "fish" refers to any type of aquatic animal in the superclass Pisces used for food. Examples of fish include, but are not limited to, salmon, tuna, seabass, tilapia, walleye, flounder, mahi mahi, halibut, cod, perch, grouper, haddock, orange roughy, shark, sturgeon, and the like. As used herein, the term "vegetables" refers to any plant of the vegetable kingdom used for food. Examples of vegetables include, but are not limited to, asparagus, carrots, potatoes, onions, cauliflower, eggplant, peppers, zucchini, leeks, broccoli, brussel sprouts, artichokes, peas, and the like.

Figure 4:
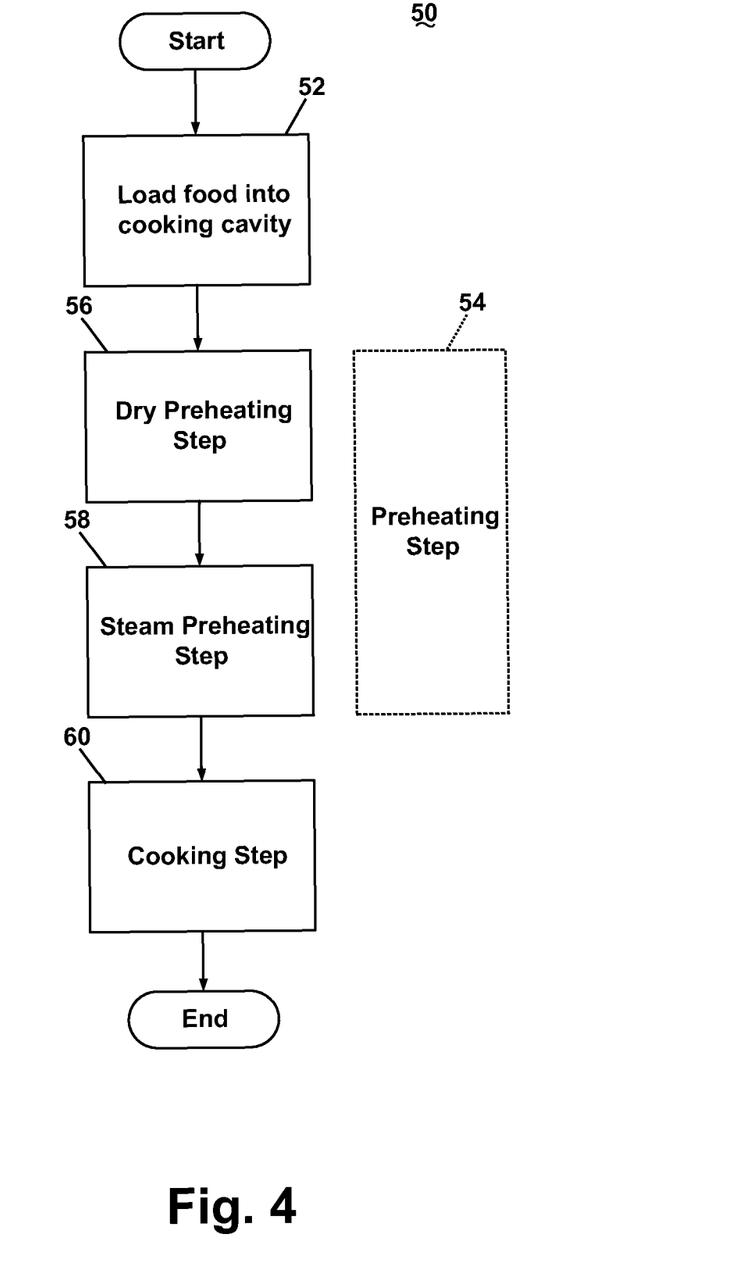
FIG. 4 is a schematic diagram illustrating a method of cooking fish and vegetables with steam according to one embodiment of the invention.
Figure 5:
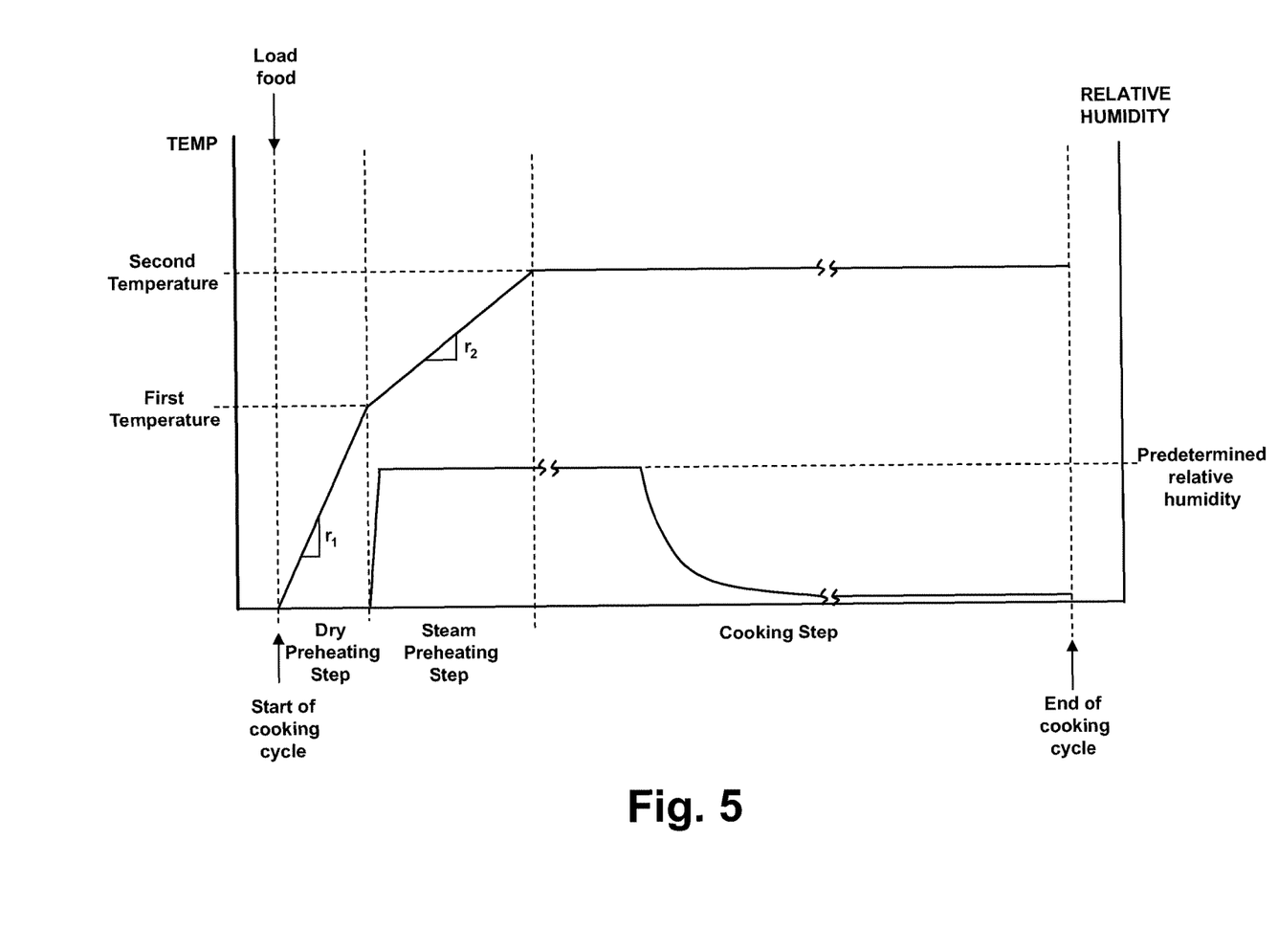
FIG. 5 is a schematic graph illustrating a temperature and a relative humidity in a cooking cavity of the oven of FIG. 1 during the execution of the method of cooking fish and vegetables with steam shown in FIG. 4.

Steps of the method 50 according to one embodiment of the invention are shown in a flow chart in FIG. 4, and the corresponding temperature of the cavity 14 and the relative humidity of the cavity 14 for the method 50 are schematically illustrated in FIG. 5. FIG. 5 is not intended to report actual behavior of the temperature and the relative humidity during the method 50; rather, FIG. 5 represents a general behavior of these properties. It will be apparent to one of ordinary skill in the oven art that, in reality, the actual temperature and the actual relative humidity fluctuate about a target temperature, while holding a temperature and while increasing the temperature, and a target relative humidity during the operation of an oven.

Before the first stage of the method 50, the user prepares the fish or vegetable, hereinafter collectively referred to as food, by trimming, seasoning, etc., if desired, and places the food and a corresponding food support, such as a cooking tray, if used, into the cavity 14, as indicated by step 52 in FIG. 4. As indicated in FIG. 4, the method 50 can be characterized as having a preheating step 54 comprising a dry preheating step 56 and a steam preheating step 58 and a cooking step 60 following the preheating step 54. The steps are defined by the operation of the heating system 35, as will be described in more detail below.

Referring particularly to FIG. 5, during the dry preheating step 56, the heating system 35 heats the cavity 14 to a first temperature at a first heating rate $r_1$, and the steam system 44 is off or not activated so that the cavity 14 is relatively dry. According to one embodiment of the invention, the first temperature is the boiling point of water. During the dry preheating step 56, the temperature of the cavity 14 is raised to at least the boiling point of water so that steam can be introduced into the cavity 14 during the steam preheating step 58. Preferably, the first heating rate is relatively fast so that the cavity 14 reaches the first temperature in a relatively short period of time. For example, a fast heating rate can correspond to operating the heating system 35 at substantially maximum capacity.

After the temperature of the cavity 14 reaches the first temperature or after a predetermined period of time, the heating system 35 heats the cavity 14 to a second temperature at a second heating rate $r_2$ during the steam preheating step 58. According to one embodiment of the invention, the second temperature is a cooking temperature, which can be entered manually by the user through the user interface 28 or set by the controller 30 according to an automatic cooking cycle. The cooking temperature is selected or set, at least in part, based on the desired doneness of the food. For the fish, in particular, the cooking temperature is sufficiently low to uniformly cook the fish while preventing overcooking, which can lead to a rubbery texture. Additionally, while the second heating rate can have any suitable value, the second heating rate is preferably less than the first heating rate. The steam system 44 begins to introduce steam into the cavity 14 during the steam preheating step 58, as will be discussed in more detail hereinafter.

The cooking step 60 begins when the temperature of the cavity 14 reaches the second temperature or after a predetermined period of time. During the cooking step 60, the heating system 35 maintains the temperature of the cavity 14 at the cooking temperature for the rest of the cooking cycle. The duration of the cooking step 60 can be set by an automatic program according to the desired doneness of the food, can be input by a user through the control panel 28 according to the desired doneness of the food, or can depend directly on the doneness of the food, such as indicated by a temperature probe, such as when the food is fish, that measures the internal temperature and, therefore, doneness of the food. According to one embodiment of the invention, the duration of the cooking step 60 is equal to a user input time less the duration of the preheating step 54. During the cooking step 60, the heating system 35 can be controlled to prevent excessive or uneven browning of the fish, such as by reducing or otherwise altering the relative amounts of the top heat and the bottom heat.

As mentioned above and shown in FIG. 5, the steam system 44 begins to introduce steam into the cavity during the steam preheating step 58. The boiler 46 can begin to preheat the water in the steam system 44 prior to the steam preheating step 58 so that the steam can be introduced into the cavity 14 at the beginning of the steam preheating step 58, if desired. Introducing steam into the cavity 14 as soon as possible during the preheating step 54 helps to ensure that the steam is present early in the cooking cycle for facilitating the cooking process. The steam preheating step 58 ensures that the food is not exposed to dry, high temperature environment, which can cause the food to dry out. Thus, the benefits of cooking with steam can be fully realized when the steam is introduced fairly quickly. Additionally, waiting until the temperature reaches at least the first temperature, which is preferably the boiling point of water, to introduce the steam into the cavity 14 ensures that the temperature of the cavity 14 is high enough to sustain steam in a vaporized state. As a result, the vapor will not condense in the cavity 14 and form water droplets on the walls 16, 18, 20, 22, 23, the food, or any other items in the cavity 14. Formation of water droplets on porcelain, which is a material found on the cavity walls 16, 18, 20, 22, 23 of many ovens, can undesirably damage the material.

The steam system 44 generates steam at a predetermined steam generation rate for a steam generation time, which is a duration for the steam system 44 to generate steam and introduce steam into the cavity 14, to reach a predetermined relative humidity, which can be entered manually by the user through the user interface 28 or set by the controller 30 according to an automatic cooking cycle. According to one embodiment of the invention, the predetermined relative humidity is a maximum relative humidity for the cavity 14. Relative humidity is the ratio of the amount of water vapor in the air at a specific temperature to the maximum amount that the air could hold at that specific temperature, and maximum relative humidity decreases with increasing temperature above 212° F. for a given pressure. Below 212° F., the maximum relative humidity at atmospheric pressure is 100%.

The steam generation time, which can be entered manually by the user through the user interface 28 or set by the controller 30 according to an automatic cooking cycle, can depend on a cooking time or can be a fixed period of time that is independent of the cooking time. The cooking time is the duration of the entire cooking cycle and can, likewise, be entered manually by the user through the user interface 28 or set by the controller 30 according to an automatic cooking cycle. The cooking time can depend on the type of food, the amount or size of the food being cooked, and the desired doneness of the food. Parameter values for different amounts of food and corresponding doneness levels of food can be stored in the controller 30. For example, the steam generation time can be calculated as a percentage of a cooking time. Thus, the steam generation time can vary from one cooking cycle to another cooking cycle, and the introduction of steam can cease before the end of the steam preheating step 58, at the end of the preheating step 58, during the cooking step 60, as illustrated in FIG. 5, or at the end of the cooking step 60.

Figure 6:
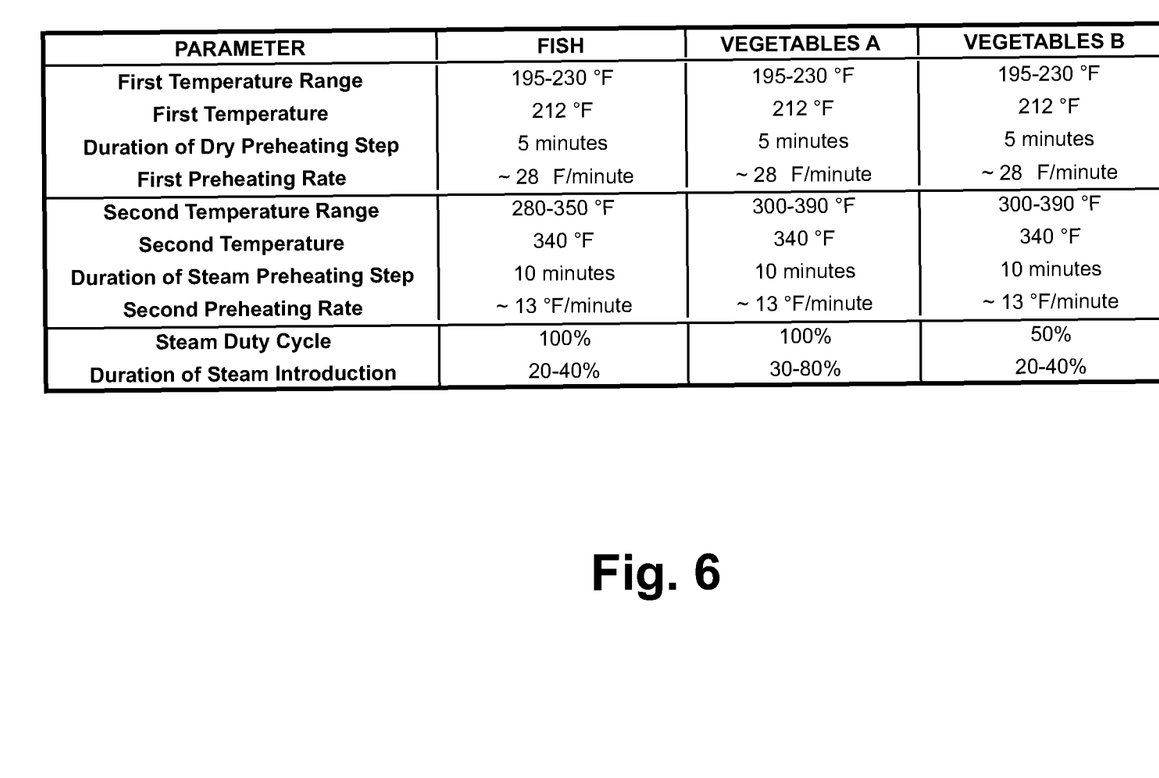
FIG. 6 is a table of exemplary parameters for implementation of the method of cooking fish and vegetables shown in FIGS. 4 and 5.

An exemplary implementation of the method 50 with the oven 10 described above, along with exemplary operational parameter values, is presented below, with it being understood that the method 50 can be utilized with any suitable household oven 10 and that the implementation of the method 50 with different ovens can differ according to the oven utilized. The exemplary operational parameter values are shown in a table in FIG. 6. FIG. 6 presents the exemplary operational parameter values for three cooking cycles: a fish cooking cycle, a first vegetables cooking cycle (Vegetables A), and a second vegetables cooking cycle (Vegetables B).

For the fish cooking cycle, the heating system 35 heats the cavity 14 to the first temperature during the dry preheating step 56. An exemplary range for the first temperature is from about 195° F. to about 230° F., and preferably, the first temperature is about the boiling point of water, or 212° F. at sea level. The duration of the dry preheating step is about 5 minutes, and the cavity 14 can reach 212° F. before the end of the 5 minutes and at least by the end of the 5 minutes. If the cavity 14 reaches 212° F. at the end of the 5 minutes, the first preheating rate averages to about 28° F. per minute. The controller 30 instructs the heating system 35 to operate both the upper and lower heating elements 36, 38 at a 100% duty cycle and to activate the convection fan 42. An exemplary duty cycle is the percentage of time the heating element is on (i.e., power is supplied to the heating element) during a certain time interval, such as 1 minute.

After the 5 minutes, the steam preheating step 58 begins, and the controller 30 instructs the heating system 35 to continue to operate the upper and lower heating elements 36, 38 at a 100% duty cycle to preheat the cavity 14 to the second temperature, which is shown in FIG. 6 as having a range of from about 280° F. to about 350° F. Preferably, the second temperature is about 340° F. The steam preheating step 58 has a duration of about 10 minutes, and the cavity 14 can reach the 340° F. before the end of the 10 minutes and at least by the end of the 10 minutes. If the cavity 14 reaches the 340° F. at the end of the 10 minutes, the first heating rate averages to about 13° F. per minute. By the end of the steam preheating step 58, the cavity 14 is uniformly heated to about 340° F. The heating system 35 maintains the temperature of the cavity 14 at about 340° F. for the cooking step 60 and can alter the duty cycles of the upper and lower heating elements 36, 38 to adjust the relative amounts of top heat and bottom heat.

The steam system 44 operates the boiler 46 at a 100% duty cycle, where, as with the heating elements 36, 38, an exemplary duty cycle for the boiler 46 is the percentage of time the boiler 46 is on (i.e., power is supplied to the boiler 46) during a certain time interval, such as 1 minute. For the oven 10 of FIG. 1, a 100% duty cycle corresponds to a steam generation rate of about 30 grams per minute. The steam generation time is 20-40% of the cooking cycle time, where 20% can correspond to a relatively small fish and 40% can correspond to a relatively large fish.

The operational parameters given in FIG. 6 for the first and second vegetable cooking cycles are similar to those for the fish cooking cycle, and the differences are discussed below. The operational parameters for the dry preheating step 56 are identical for all of the cooking cycles shown in FIG. 6 because during this step, the cavity 14 is heated to the first temperature to prepare the cavity 14 for the introduction of steam, a process that is independent of the type of food being cooked. The range for the second temperatures for the first and second vegetable cooking cycles, about 300° F. to about 390° F., is higher than that of the fish. While the cooking temperature of the fish should be sufficiently low to prevent the fish from overcooking, the vegetables can sustain higher cooking temperatures, and high cooking temperatures can facilitate roasting of the vegetables, if desired.

Other differences between the first and second vegetable cooking cycles and the fish cooking cycles and between the first vegetable cooking cycle and the second vegetable cooking cycle are the steam duty cycle and the steam generation time, or duration of steam introduction. For the first vegetable cooking cycle, the steam duty cycle is 100%, as in the fish cooking cycle, but the steam generation time can range from 30-80% of the cooking time. Conversely, the second vegetable cooking cycle has a steam generation time ranging from 20-40% of the cooking time, as in the fish cooking cycle, but the steam duty cycle is 50%. For the oven 10 of FIG. 1, a 50% duty cycle corresponds to a steam generation rate of about 15 grams per minute. These parameters vary according to the type of vegetable being cooked. For example, the first vegetables cooking cycle is suitable for use with onions, potatoes, carrots, cauliflower, and eggplant, while the second vegetables cooking cycle can be used for peppers, zucchini, and leeks. The vegetables in the latter group absorb moisture more readily than the former group of vegetables, so less steam is required during the cooking cycle. The steam duty cycle value can differ from these values and, for the vegetables, and an exemplary range for the steam duty cycle for vegetables is from about 50% to about 100%. Ultimately, the steam duty cycle and the steam generation time depend on the type of food, the size of the food, and the desired doneness of the food.

As mentioned above, the operational parameter values shown in FIG. 6 are dependent on the oven 10 utilized to implement the method. Different ovens have different types of heating systems (e.g., some ovens do not have the convection fan 42) and steam systems, which affect the implementation of the method 50. For example, the above operational parameter values were determined with the cooling fan 34 operational during the entire cooking cycle. Because the cooling fan 34 can draw away heat from the cooking cavity 14 through the cooking cavity walls 16, 18, 20, 22, 23, the cooling fan 34 can affect the temperature of the cavity 14.

When the user desires to cook fish or vegetables using the method 50, the user prepares the food, places the food along with a food support, if used, in the cavity 14, and closes the door 24. Next, the user selects a "FISH" cooking cycle or a "VEGETABLES" cooking cycle on the oven 10 through the control panel 28. The user also enters values for parameters, such as the cooking temperature and the cooking time, if needed, through the control panel 28. The oven 10 then implements the cooking cycle, beginning at the dry preheating step 56 and ending at the cooking step 60. Following the cooking step 60, the user removes the food, which is cooked to the desired doneness, from the cavity 14.

It is possible to vary or otherwise alter certain aspects of the method 50 without departing from the scope of the invention. For example, the dry preheating step can comprise multiple heating rates rather than a single heating rate, whereby the temperature of the cavity 14 is raised to a first preheat temperature at a first preheating rate and thereafter raised to a second preheat temperature at a second preheating rate different than the first preheating rate. An illustration of this example is heating the cavity 14 to about 185° F. in about 4 minutes and then heating the cavity to about 212° F. in about 2 minutes. By slowing down the heating of the cavity 14 before reaching the boiling point of water, the heating system 35 can more effectively heat the cavity 14 so that the entire cavity 14, including any spaces and items in the cavity 14, is uniformly heated to the boiling point of water. Furthermore, the cooking step 60 has been described above and shown in FIG. 5 as maintaining the temperature of the cavity 14 at a constant second temperature. However, it is within the scope of the invention to vary the second or cooking temperature and, therefore, the temperature of the cavity 14 during the cooking step 60; thus, the term "maintain" is intended to include keeping the temperature of the cavity 14 substantially constant and varying the temperature of the cavity 14 according to the second or cooking temperature.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method of cooking food using steam during a cooking cycle with a cooking time in an automated household oven with a cooking cavity, a heating system for heating the cooking cavity, and a steam system for introducing steam into the cooking cavity, the method comprising:
   a preheating step where the cooking cavity is heated toward a cooking temperature, which is greater than the boiling point of water and comprising:

a dry preheating step where heat is supplied to the cooking cavity from the heating system to raise an air temperature in the cooking cavity to a first temperature, which is greater than or equal to the boiling point of water, without the introduction of steam into the cooking cavity; and a steam preheating step where heat is supplied to the cooking cavity to increase the air temperature in the cooking cavity from the first temperature to the cooking temperature, which is greater than the first temperature, with the introduction of steam into the cooking cavity; and a cooking step where the cooking cavity is maintained at the cooking temperature.

2. The method according to claim 1, wherein the steam is introduced into the cooking cavity at the beginning of the steam preheating step.

3. The method according to claim 1, wherein the cooking temperature is in a range of about 280° F. to about 350° F.

4. The method according to claim 1, wherein the cooking temperature is about 340° F.

5. The method according to claim 1, wherein the cooking temperature is in a range of about 300° F. to about 390° F.

6. The method according to claim 1, wherein the cooking step comprises introducing steam into the cooking cavity.

7. The method according to claim 6, wherein the introduction of steam during the cooking step is a continuation of the introduction of steam during the steam preheating step.

8. The method according to claim 6, wherein the cooking step further comprises ceasing the introduction of steam before the end of the cooking step.

9. The method according to claim 1, wherein the introduction of steam has a duration in a range of about 20-40% of the cooking time.

10. The method according to claim 9, wherein a duty cycle of a boiler for the steam system is in a range of about 50% to about 100% during the introduction of steam.

11. The method according to claim 10, wherein the duty cycle of the boiler for the steam system is about 100% during the introduction of steam.

12. The method according to claim 10, wherein the duty cycle of the boiler for the steam system is about 50% during the introduction of steam.

13. The method according to claim 1, wherein the introduction of steam has a duration in a range of about 30-80% of the cooking time.

14. The method according to claim 13, wherein a duty cycle of a boiler for the steam system is about 100% during the introduction of steam.

15. The method according to claim 14, wherein a duty cycle of a boiler for the steam system is in a range of about 50% to about 100% during the introduction of steam.

16. The method according to claim 1, wherein a duty cycle of an upper heating element for creating top heat and a duty cycle of a lower heating element for creating bottom heat are about 100% during the preheating step.

17. The method according to claim 16, wherein the cooking step comprises reducing at least one of the top heat and the bottom heat.

18. The method according to claim 17, wherein the cooking step further comprises reducing both of the top heat and the bottom heat.

19. The method according to claim 1, wherein the food is in the cooking cavity during the steam preheating step.

20. The method according to claim 19, wherein the food is in the cooking cavity during the dry preheating step.

* * * * *